(12) United States Patent
Zhang et al.

(10) Patent No.: US 8,505,310 B2
(45) Date of Patent: Aug. 13, 2013

(54) GAS TURBINE EJECTOR AND METHOD OF OPERATION

(75) Inventors: Hua Zhang, Greer, SC (US); David Wesley Ball, Jr., Easley, SC (US); Ravi Praveen Eluripati, Simpsonville, SC (US); Christina Renee Pompey, Simpsonville, SC (US); Kenneth Neil Whaling, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 1127 days.

(21) Appl. No.: 12/255,723

(22) Filed: Oct. 22, 2008

(65) Prior Publication Data

US 2010/0096474 A1    Apr. 22, 2010

(51) Int. Cl.
*F02C 7/18*    (2006.01)
*F02C 6/08*    (2006.01)
*F04F 5/46*    (2006.01)

(52) U.S. Cl.
USPC ................................ 60/782; 60/785; 417/179

(58) Field of Classification Search
USPC .................... 60/806, 784, 785, 782; 417/179
See application file for complete search history.

(56) References Cited

U.S. PATENT DOCUMENTS

| 1,262,102 | A | * | 4/1918 | Schmidt | 417/179 |
|---|---|---|---|---|---|
| 2,074,480 | A | * | 3/1937 | MacLean | 417/179 |
| 2,164,263 | A | * | 6/1939 | Wall | 417/179 |
| 2,190,109 | A | * | 2/1940 | Tinker | 417/179 |
| 2,556,899 | A | * | 6/1951 | Broussard | 417/179 |
| 4,586,873 | A | * | 5/1986 | Lepretre et al. | 417/185 |
| 4,847,043 | A | * | 7/1989 | Gluntz | 417/197 |
| 6,550,253 | B2 | * | 4/2003 | Mortzheim et al. | 60/782 |
| 6,615,574 | B1 | | 9/2003 | Marks | |
| 6,877,960 | B1 | * | 4/2005 | Presz et al. | 417/198 |
| 7,076,952 | B1 | * | 7/2006 | Vetrovec | 123/559.1 |
| 7,536,864 | B2 | * | 5/2009 | Wolfe et al. | 60/782 |
| 8,083,495 | B2 | * | 12/2011 | Whaling et al. | 417/198 |
| 2002/0119051 | A1 | * | 8/2002 | Campbell et al. | 417/198 |

OTHER PUBLICATIONS

English Translation of Notice of Rejection regarding corresponding CN Application No. 200910209824.9; dated Apr. 1, 2013; 8 pgs.

* cited by examiner

*Primary Examiner* — Ted Kim

(74) *Attorney, Agent, or Firm* — Cantor Colburn LLP

(57) ABSTRACT

An ejector system and method of operation for combining high and low pressure fluid flow streams is disclosed. A nozzle chamber communicates with a high pressure fluid flow stream and a suction chamber communicates with a low pressure fluid flow stream. The outlet of the nozzle chamber exit into the suction chamber and include multiple nozzles such that the high pressure flow stream exits the nozzle chamber in multiple flow streams having multiple surface areas for interlayer drag between the flows. The low pressure fluid flow stream is entrained by the high pressure fluid flow streams exiting the multiple nozzles to define an intermediate pressure flow stream.

9 Claims, 4 Drawing Sheets

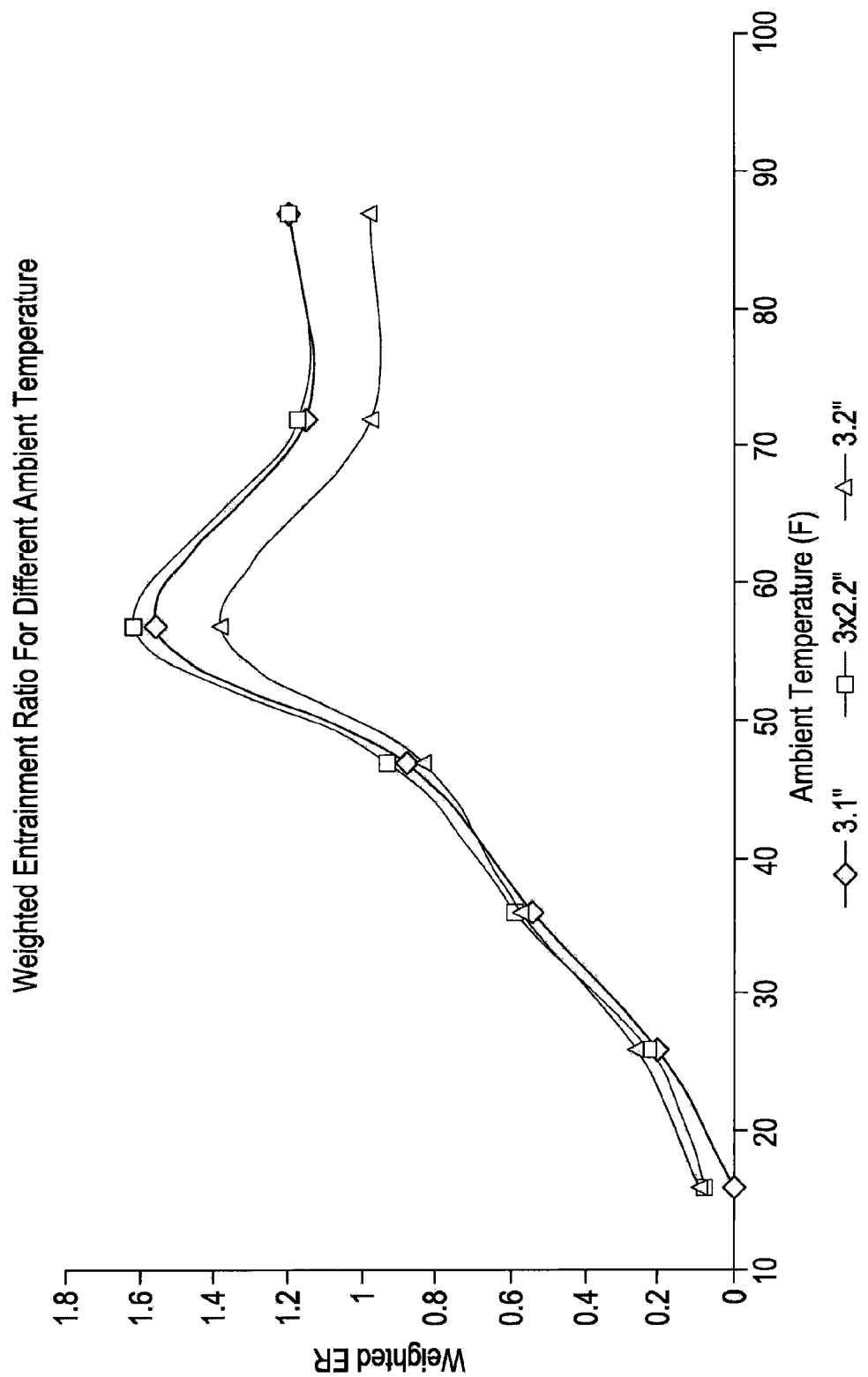

GAS TURBINE EJECTOR AND METHOD OF OPERATION

BACKGROUND OF THE INVENTION

The subject matter disclosed herein relates to a system for improving the cooling performance of a turbine engine by utilizing an ejector system that increases compressor air entrainment efficiency. The axial location, or stage, at which compressed air is diverted from a compressor for cooling a multi-stage turbine in a turbine engine is determined by the pressure required to drive the specific systems to be serviced by that air. Diverting compressed air from the earliest possible stage of a compressor will increase overall turbine efficiency by reducing the amount of compressor work invested in the diverted air, as well as reducing the temperature of the diverted and, thus, the delivered compressed air. Therefore, it is desirable to achieve the system supply pressure from the earliest and lowest pressure stage of the compressor.

Known systems divert compressed air from plural ports in a multi-stage compressor to provide cooling and/or sealing air to an associated multi-stage turbine. These systems utilize a low pressure extraction flow path for conducting compressed air from a lower pressure, lower temperature stage of the compressor to the turbine and a high pressure extraction flow path for conducting compressed air from a higher pressure, higher temperature stage of the compressor to the turbine. A crossover flow path may be used to interconnect the low pressure extraction flow path, and the high pressure extraction flow path. Such a crossover allows selective control of the compressed air delivered to the multi-stage turbine such that a desired pressure and an economic mixture of air are diverted from the compressor.

The low and high pressure air is combined through the use of an ejector system which utilizes the momentum of motive flow of the high pressure air through a nozzle to create a suction flow of low pressure air surrounding the nozzle. Interlayer shear operates between the high and low pressure air flow streams within the ejector system resulting in entrainment (suction flow) of the low pressure air with the high pressure flow stream. It is therefore desirable to increase the entrainment of low pressure air flow within the high pressure air flow, to improve the efficiency of the ejector system.

BRIEF DESCRIPTION OF THE INVENTION

In one embodiment of the invention an ejector system for combining a high pressure fluid flow stream with a low pressure fluid flow stream is described. A nozzle chamber in communication with a high pressure fluid flow stream has an inlet and an outlet. A suction chamber in communication with a low pressure fluid flow stream includes an inlet, an outlet and is configured to receive the outlet of the nozzle chamber. The outlet of the nozzle chamber includes multiple nozzles such that the high pressure flow stream exits the nozzle chamber to define multiple flow streams having multiple surface areas for interlayer drag between the multiple high pressure flow streams and the low pressure flow stream in the suction chamber. As such, the low pressure fluid flow stream is entrained by the high pressure fluid flow streams.

In another embodiment of the invention, a method of combining a high pressure fluid flow stream with a low pressure fluid flow stream from a multistage compressor includes diverting low pressure compressor air through a low pressure extraction circuit and diverting high pressure compressor air through a high pressure extraction circuit. The low pressure compressor air is delivered to an inlet of a suction chamber in an ejector assembly. The high pressure compressor air is delivered to an inlet of a nozzle chamber having an outlet disposed within the suction chamber and proximate to an outlet thereof. The high pressure compressor air is ejected through multiple outlet nozzles to define multiple, high pressure flow streams having multiple surface areas for interlayer drag between the multiple high pressure flow streams to thereby entrain the low pressure compressed air in the suction chamber in an intermediate pressure, compressed air flow stream.

BRIEF DESCRIPTION OF THE DRAWINGS

The invention, in accordance with preferred and exemplary embodiments, together with further advantages thereof, is more particularly described in the following detailed description taken in conjunction with the accompanying drawings in which:

FIG. 4 is a graph of the weighted entrainment ratio which illustrates the performance of the multi-nozzle ejector nozzle of FIG. 3.

DETAILED DESCRIPTION OF THE INVENTION

Figure 1:
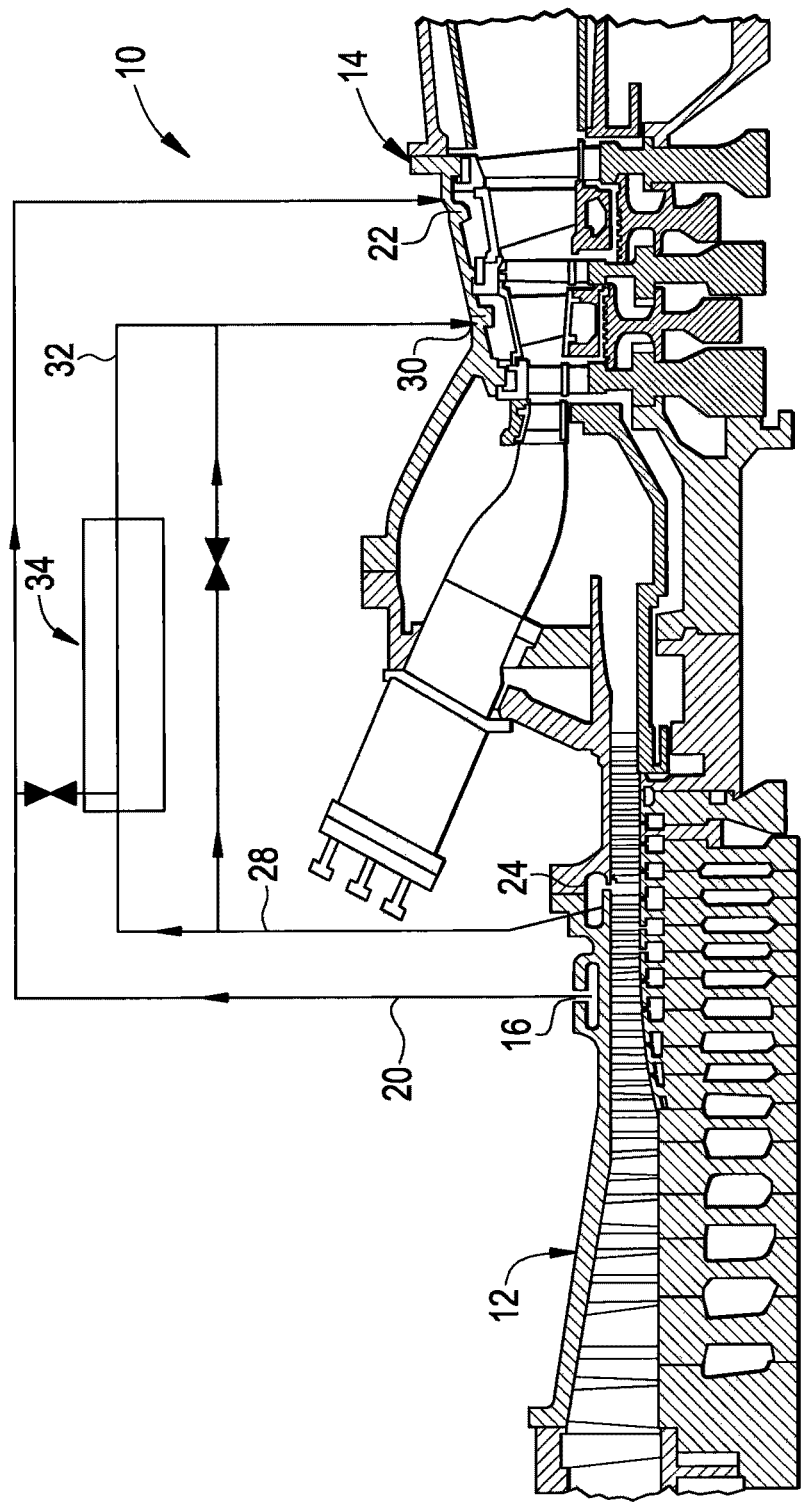
FIG. 1 is a partially schematic, axial sectional view of a gas turbine engine in accordance with an exemplary embodiment of the present invention.
Figure 2:
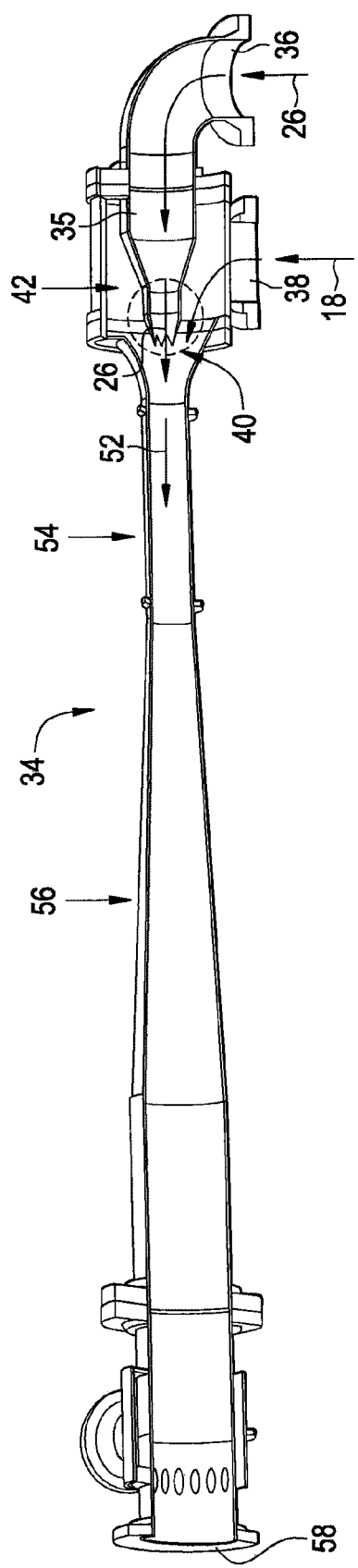
FIG. 2 is an axial sectional view of a portion of an ejector assembly of FIG. 1.

With reference to FIGS. 1 and 2, there is shown an extraction system 10 for diverting compressed air from plural ports of a multi-stage compressor 12 to provide cooling and sealing air to an associated multi-stage turbine 14. A first casing port 16 is associated with a low pressure stage of the compressor 12 for extracting relatively low pressure, compressed air 18 therefrom. A low pressure, first extraction circuit 20 extends from the first casing port 16 to a first target port 22 of the multi-stage turbine 14 for cooling and/or sealing. A second casing port 24 is provided downstream from the first casing port 16, and is associated with a higher pressure stage of the compressor for the extraction of relatively high pressure, compressed air 26 therefrom. A high pressure, second extraction circuit 28 is provided for flow of the higher pressure compressed air from the second casing port 24 to a second target port 30 of the turbine. In gas turbine engines of the type described, cooling air which is extracted from multiple ports 16, 24 of a multistage compressor 12 will typically have a pressure differential of at least 16 psi in order to achieve a desirable level of cooling in the multi-stage turbine. A crossover circuit 32 is further provided for selective flow, between the lower pressure, first extraction circuit 20 and the higher pressure, second extraction circuit 28, for selective air flow therebetween. In an exemplary embodiment an ejector system 34 is disposed in the cross-over circuit 32. The ejector system includes a nozzle chamber 35, which receives the high pressure compressed air 26 from second extraction circuit 28 through a motive inlet 36. The nozzle chamber is disposed within a suction chamber 42 having a suction inlet 38, which receives lower pressure compressed air 18 from first extraction circuit 20. High pressure compressed air 26 exits the nozzle chamber 35 and enters the suction chamber 42, through nozzle outlet 40, FIG. 3. Lower pressure compressed air entering suction chamber 42 through suction inlet 38 flows into the suction chamber adjacent to nozzle outlet 40.

Figure 3:
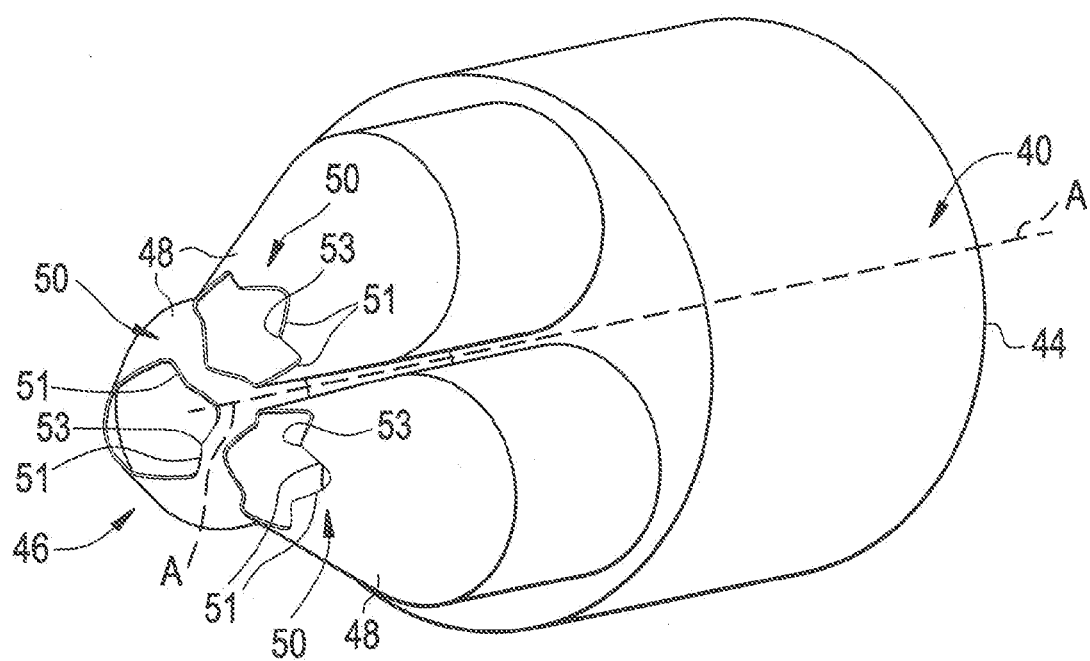
FIG. 3 is an enlarged perspective view of a multi-nozzle ejector nozzle of the ejector assembly of FIG. 2.

Nozzle outlet 40 comprises an inlet end 44 and an outlet end 46. The outlet end 46 of nozzle 40 includes multiple high pressure feed air nozzles 48 through which the high pressure compressed air exits the nozzle chamber 35 and enters suction chamber 42. Each of the high pressure feed air nozzles 48 have an outlet end 50, where the outlet end 50 includes a series of undulations or teeth 51. The teeth 51 may include a generally pointed configuration that is oriented with respect to a central axis A-A of the nozzle outlet 40. Specifically, the teeth 51 may have an apex or point 53 that extends towards the central axis A-A. In particular, the teeth 51 are oriented generally axisymmetrical with respect to the central axis A-A. The injection of high pressure compressed air 26 into suction chamber 42 utilizes the momentum of the motive flow of the air to establish a suction flow in the suction chamber 42. The use of multiple nozzles 48 increases the surface area for interlayer drag between the high pressure compressed air 26 exiting the nozzle chamber 35 and the lower pressure compressed air 18 in the suction chamber 42, over the surface area defined by a single nozzle ejector. As such, lower pressure compressed air flow entrainment is improved over single nozzle ejectors. In a non-limiting embodiment, the number of multiple high pressure feed air nozzles 48 disposed at the outlet end 46 of the nozzle 40 is preferably an odd number such as the three nozzles shown in FIG. 3. Specifically, in the embodiment as shown in FIG. 3, the three high pressure feed air nozzles 48 are arranged around the central axis A-A. That is, there is no high pressure feed air nozzle 48 located at the central axis A-A of the nozzle outlet. The use of an odd number of nozzles defines a non-symmetrical nozzle configuration which has been found to have a preferential effect in lowering the flow induced vibration and acoustical effect arising therefrom. Such acoustics are more likely to occur in symmetrical situations such as in even numbered nozzle configurations.

Compressed air exiting suction chamber 42 includes a mixture of higher pressure compressed air 26 and lower pressure compressed air 18 which is effectively entrained by the higher pressure compressed air exiting the nozzles 48 of the multi-nozzle 40. A high and low pressure compressed air mixture 52 results in an intermediate compressed air pressure and temperature exiting the suction chamber 42. The intermediate compressed air 52 enters mixing tube 54 and passes through the diffuser 56 before delivery to the second target port 30 of turbine 14 through discharge outlet 58.

The increased surface area for interlayer drag between the high and low pressure compressed air 26, 18 flowing through the suction chamber 42 results in the entrainment ratio (the quantity of low pressure air taken up by the motive force of the high pressure air) being increased and, over a broader range of operational conditions. With an improvement in the entrainment of lower pressure air, the efficiency of the turbine system can be increased.

Computational Fluid Dynamics (CFD) models have been created to evaluate ejector performance with different nozzle structures. As shown in FIG. 4, one example of an application of the multi-nozzle ejector system of the present invention results in an improved entrainment ratio over single nozzle ejectors in the same application. With the overall efficiency defined as the integral of weighted entrainment ratio over the ambient temperature range, a five percent gain in overall efficiency is shown with the multi-nozzle design illustrated in FIG. 4. This example is intended to show the performance improvement of the multi-nozzle ejector system over single nozzle systems and the actual percentage gain in overall efficiency is expected to vary based upon the specific application. While the multi-nozzle ejector system of the present invention has been described primarily as it may be applicable to an extraction system 10 for diverting compressed air from a multistage compressor 12 to a multi-stage turbine 14, it is contemplated that the multi-nozzle ejector system has many applications where multiple fluid streams, not limited to air, at differential pressures, likely as low as 2 psi, are combined in an efficient manner.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. An ejector system for combining a high pressure fluid flow stream with a low pressure fluid flow stream comprising;
a nozzle chamber in communication with a high pressure fluid flow stream having an inlet and an outlet;
a suction chamber in communication with a low pressure fluid flow stream having an inlet, an outlet and configured to receive the outlet of the nozzle chamber therein;
the outlet of the nozzle chamber defining multiple nozzles and a central axis, the multiple nozzles each having an outlet end that includes a series of undulations, and wherein the high pressure flow stream exits the nozzle chamber to define multiple flow streams having multiple surface areas for interlayer drag between the multiple high pressure flow streams and the low pressure flow stream in the suction chamber, wherein the low pressure fluid flow stream is entrained by the high pressure fluid flow streams, and wherein each of the series of undulations include an apex that is oriented towards the central axis of the outlet of the nozzle chamber, and the undulations are generally axisymmetric with respect to the central axis.

2. An ejector system as described in claim 1, wherein the outlet of the nozzle chamber includes three nozzles.

3. An ejector system as described in claim 1, wherein the outlet of the nozzle chamber includes an odd number of nozzles.

4. An ejector system as described in claim 1, wherein the outlet of the nozzle chamber includes a non-symmetrical nozzle configuration.

5. A turbine engine comprising;
a multistage compressor and a multistage turbine;
an extraction system operable to divert compressed air from the multi-stage compressor to the multistage turbine, the extraction system comprising;
a first extraction circuit for diversion of low pressure compressed air and a second extraction circuit for diversion of high pressure compressed air to the turbine;
a cross-over circuit extending between the first and the second extraction circuits for selective flow therebetween;
an ejector assembly disposed in the cross-over circuit, for combining the low pressure compressed air and the high pressure compressed air, including a nozzle chamber in communication with the second extraction circuit, and having an inlet for receiving the high pressure compressed air and an outlet defining multiple nozzles and a central axis;

a suction chamber in communication with the first extraction circuit, and having an inlet for receiving the low pressure compressed air, an outlet and configured to receive the outlet of the nozzle chamber therein; and multiple high pressure flow streams defined by the multiple nozzles and having multiple surface areas for interlayer drag between the multiple high pressure flow streams to thereby entrain the low pressure compressed air in the suction chamber to define an intermediate pressure, compressed air flow stream, the multiple nozzles each having an outlet end that includes a series of undulations, and wherein each of the series of undulations include an apex that is oriented towards the central axis of the outlet of the nozzle chamber, and the undulations are generally axisymmetric with respect to the central axis.

6. A turbine engine as described in claim 5, wherein the outlet of the nozzle chamber includes three nozzles.

7. A turbine engine as described in claim 5, wherein the outlet of the nozzle chamber includes an odd number of nozzles.

8. A turbine engine as described in claim 5, wherein the outlet of the nozzle chamber includes a non-symmetrical nozzle configuration.

9. A method for combining a high pressure fluid flow stream with a low pressure fluid flow stream from a multistage compressor of a turbine engine comprising;

diverting low pressure compressor air through a low pressure extraction circuit and diverting high pressure compressor air through a high pressure extraction circuit;

delivering the low pressure compressor air to an inlet of a suction chamber in an ejector assembly, delivering the high pressure compressor air to an inlet of a nozzle chamber having an odd number of multiple outlet nozzles disposed within the suction chamber and proximate to an outlet thereof, the outlet having a central axis and the multiple outlet nozzles being arranged such that none of the multiple outlet nozzles are located at the central axis, wherein the multiple outlet nozzles each have an outlet end that includes a series of undulations, and wherein each of the series of undulations include an apex that is oriented towards the central axis of the outlet of the nozzle chamber, and the undulations are generally axisymmetric with respect to the central axis; and ejecting said high pressure compressor air through the multiple outlet nozzles to define multiple high pressure flow streams, defined by the multiple outlet nozzles, having multiple surface areas for interlayer drag between the multiple high pressure flow streams to thereby entrain the low pressure compressed air in the suction chamber to define an intermediate pressure, compressed air flow stream.

* * * * *